3,809,722
PROCESS FOR PRODUCING ALKOXY ALDEHYDES
Albert Bouniot, Melle, France, assignor to
Melle-Bezons, Melle, France
Filed Dec. 20, 1968, Ser. No. 785,575
Claims priority, application France, Jan. 3, 1968,
134,729
Int. Cl. C07c 47/02
U.S. Cl. 260—602                   16 Claims

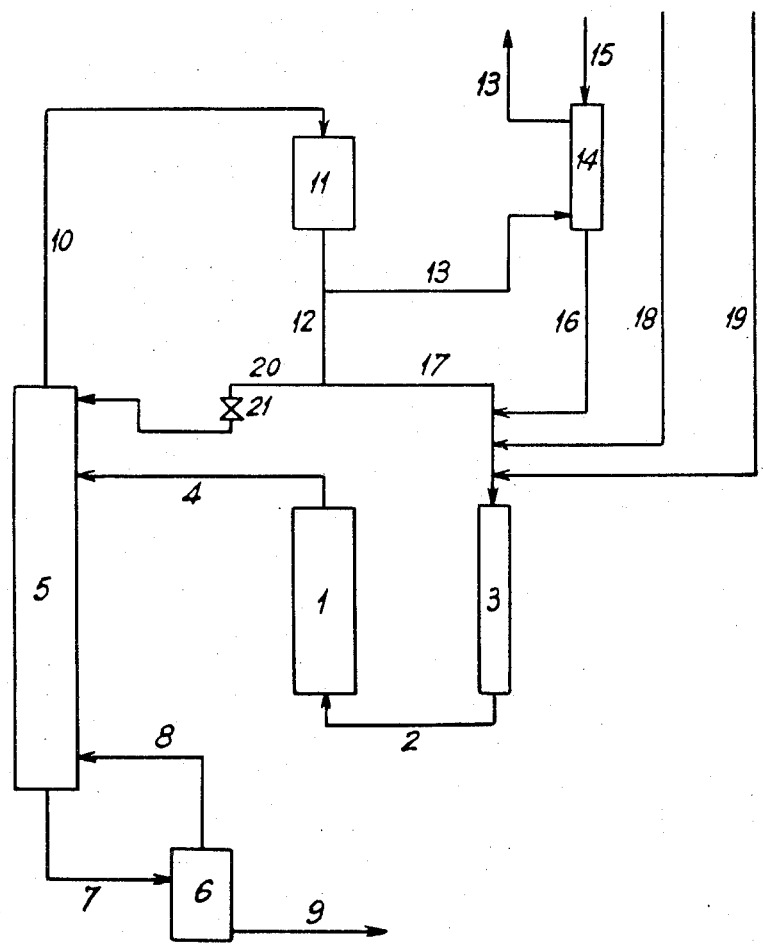

ABSTRACT OF THE DISCLOSURE

The process for producing a β-alkoxy aldehyde by condensing a lower α,β-olefinic aliphatic aldehyde with a lower alkanol in the presence of a volatile tertiary amine catalyst.

---

This invention relates to the production of alkoxy aldehydes.

It is known that alcohol can be fixed onto the ethylenic linkage of an α,β-olefinically unsaturated aliphatic aldehyde, producing a β-alkoxy aldehyde in accordance with the following reaction:

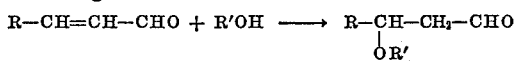

In the above formulae, R is hydrogen or an aliphatic radical such as methyl or ethyl and R′ is an aliphatic radical such as methyl, ethyl, propyl, isopropyl, butyl or isobutyl.

It is also known that the above addition reaction can be catalyzed by an alkaline reagent. In such instance, and when the starting olefinic aldehyde is acrolein, which substance is liable to polymerization in alkaline medium, it is known to operate in a buffered medium, such as with a buffer of an amine salt.

Since the above reaction is reversible, it is necessary to remove the catalyst before concentration of the alkoxy aldehyde product. When the catalyst is an alkaline reagent, removal is achieved simply by neutralization. Under the action of heat, however, the salts resulting from such neutralization tend to cause slow decomposition of alkoxy aldehydes and distillation of the latter accordingly becomes very delicate. To avoid such inconveniences, it has been proposed to operate in the presence of a catalyst remaining in the heterogeneous phase, such as an ion exchange resin or an insoluble hydroxide which may be deposited on a carrier. It has been found that the active life of such catalyst is generally short because of the clogging of their active centers by polymerization products of the olefinic aldehyde, especially in the case of acrolein.

It is an object of this invention to avoid at least in part the aforementioned inconveniences.

In accordance with the practice of this invention, a low boiling alkanol is condensed with a low boiling α,β-olefinic aliphatic aldehyde in the presence of a very small amount of a volatile tertiary amine, as a catalyst.

In actual practice, the process of this invention is of particular interest when the olefinic aldehyde is acrolein and the alkanol is methanol or ethanol because the reaction speed with these reactants is high. Accordingly, the alkoxy aldehydes which are most advantageously produced by the present process are β-methoxy propionaldehyde and β-ethoxy propionaldehyde. The β-methoxy propionaldehyde yield is materially above the yield of β-ethoxy propionaldehyde.

A practical advantage of the present process is that after the reaction, it is sufficient to separate by distillation the volatile amine employed as a catalyst. The process is especially interesting as a continuous operation in which the amine may be distilled off together with unconverted reactants and recycled to the reaction zone.

A tertiary amine is preferred over a primary or secondary amine in order to avoid formation of an imine by reaction of the olefinic aldehyde with the amine. If it is desired to remove the amine at the beginning of the distillation of the reaction mixture, the amine should be selected so that its boiling point is below that of each of the other substances present. In actual practice, trimethyl amine, ethyl dimethyl amine, and diethyl methyl amine are preferred. At the present time, trimethyl amine is more preferred because of its ready availability.

Preferably tertiary amines are employed in an amount within the range of 50 to 300 p.p.m. in the reaction mixture and the contact time of the reactants with the amine is from 10 to 45 minutes. The reaction is carried out at a temperature within the range of 5° to 30° C. and preferably 15° to 20° C. The operating pressure is advantageously atmospheric or slightly above atmospheric. In actual practice, it is not desirable to work above 1 kg./cm.², effectively.

The annexed diagram schematically illustrates an apparatus suitable for carrying out the process of the invention in a continuous operation. The diagram is merely illustrative and does not limit the scope of the invention.

The apparatus comprises a reactor 1, preferably cylindrical, having a capacity to insure the required contact time of the reactants and amine catalyst passed therethrough. The reactants and catalyst are fed thereto by a pipe 2 after being cooled to the desired temperature by a cooler 3. Preferably the rate of flow of the liquid mixture through the reactor is controlled depending upon the shape and size of the reactor so that turbulent flow will be avoided, i.e. that the flow therethrough is laminar.

The reaction mixture leaving the reactor through pipe 4 is fed to the upper portion of a distillation column 5. The column need not have more than five or six theoretical plates. The column 5 is heated by means of a boiler 6 which receives the tailings from the distillation column through pipe 7 and feeds it with vapors resulting from the distillation column through pipe 7 and feeds it with vapors resulting from the vaporization of these products through pipe 8. Boiler 6 is operative with a short contact time and a small temperature gradient. The alkoxy aldehyde is drawn off from the boiler in the liquid phase through pipe 9. Preferably an excess of alkanol is used, so that at the foot of column 5, the alkoxy aldehyde is dissolved in unconverted alkanol and, consequently, the temperature is comparatively low in boiler 6.

The vapors issuing from the top of column 5 through pipe 10 are advanced to a condenser 11. The distillate contains unconverted olefinic aldehyde and alkanol and tertiary amine catalyst. A large portion of the amine dissolves in the condensate formed in the condenser 11 and which flows down through pipe 12. However, especially in the case where trimethyl amine is employed, a greater or lesser loss of this amine may take place through vent 13 of the column. This loss can be considerably reduced by inserting a small washing column 14 in line 13 in which the washing column is fed at the top through pipe 15 with the alkanol reactant that dissolves at least a part of the amine in column 14 before vent 13 communicates with the surrounding atmosphere. From the base of column 14 a dilute solution of amine in alkanol issues through pipe 16 and is introduced into pipe 17 through which the major portion of the condensate flowing through pipe 12 is recycled to cooler 3. Pipe 17 also receives the starting olefinic aldehyde and a balance of tertiary amine through pipes 18 and 19 respectively, the latter preferably in alkanolic solution. The total of these liquids passes through cooler 3 for feeding reactor 1.

It is possible, if need be, to return a portion of the distillate to the top of column 5 by pipe 20 provided with a valve 21.

To start up the apparatus, the whole apparatus is loaded with alkanol and distillation is commenced. When the distillation equilibrium is established, olefinic aldehyde is introduced in an amount to reach and maintain a suitable aldehyde content in the reactor. The amine catalyst is then introduced to obtain the desired conversion rate at the exit of the reactor. The temperature at the outlet of the cooler 3 is controlled so that the temperature at the outlet of the reactor is maintained at the desired value. The alkanol feed is controlled so as to maintain a substantially constant alkoxy aldehyde content in boiler 6, which control is easy because the temperature in boiler 6 is a function of this content.

The optimum operating conditions in continuous operation are as follows:

Aldehyde content in the reactor—1–2 moles/kg.
Conversion rate of the olefinic aldehyde at the exit from the reactor—25–40%
Alkoxy aldehyde content of the product withdrawn through pipe 9—50–70%

Operating under these conditions, the following results are obtained, starting from acrolein and methanol:

$\beta$-methoxy propionaldehyde yield with respect to acrolein—93–99%
Productivity (kg. per day per liter of reactor)—2.5–3.5.

The main advantages of the process of the invention are the following:

The catalyst is easily removed by distillation.
There is no problem of length of active life of the catalyst. If losses of tertiary amine occur, it is easy to compensate for them by continuously feeding amine.
The catalyst is used in very small amounts and is not expensive.
An apparatus of simple design can be employed, since the reactor is simple. The whole apparatus can be made of ordinary steel.
The yields are very high.
The reaction can be carried out at comparatively high temperature. This unaccustomed circumstances avoids the need of a refrigeration unit to cool the reactor.
The reaction can be performed with a relatively high conversion rate and a high aldehyde content in the reactor. This results in heat savings in the distillation step of the reaction mixture.
The apparatus described is very versatile.

Preferably, the acrolein brought into play usually contains a stabilizer. Hydroquinone, for example, in an amount within the range of 0.01% to 0.1% by weight is well suited for this purpose. The acrolein may, without inconvenience, contain small amounts of water such as 1% to 2% by weight, and also propionaldehyde, which is removed together with the unconverted methanol from the base of the distillation column for the reaction mixture.

It is recommended that use be made of acrolein and alkanol free of acetone or hydrocarbons, such as benzene or cyclohexane, because such impurities are harmful and they are difficult or expensive to remove.

The following examples are given by way of illustration, but not by way of limitation, of the process of this invention carried out as a continuous operation in the apparatus described:

EXAMPLE 1

In reactor 1, the volume of which is 2 liters, there is performed condensation of acrolein with methanol to produce $\beta$-methoxy propionaldehyde, the operation conditions at equilibrium being as follows:

Acrolein feed rate through pipe 18 (there is used freshly-distilled acrolein, of 99% purity and to which is added 0.1% by weight of hydroquinone)—0.18 liters per hour.
Methanol feed rate through pipe 15—0.2 liters per hour.
Catalyst feed rate through pipe 19 (solution at 1 gram per liter of trimethyl amine in methanol)—0.05 liters per hour.
Contact time, about—28 minutes.
Temperature at the inlet of reactor 1—9° C.
Temperature at the outlet of reactor 1—19° C.
Aldehyde content of the reaction mixture leaving reactor 1 (the determination is done by means of hydroxylamine hydrochloride)—1.7 moles/kg.
Temperature at the top of column 5—64° C.
Flow rate of the distillate through pipe 12—3.8 liters per hour.
Temperature in boiler 6—68° C.
Aldehyde content of the mixture withdrawn by pipe 9—7.7 moles/kg.
(The determination is done by means of hydroxylamine hydrochloride).

Over 5 hours running at the equilibrium, the balance is as follows:

Acrolein fed—760 g.
Methanol fed—975 g.
Product (with an aldehyde content of 7.7 moles/kg.) withdrawn by pipe 9—1720 g.

Analyses effected by gas phase chromatography show that:

At the exit from the reactor, the conversion rate of acrolein to methoxy propionaldehyde is 38%.
The trimethyl amine content in the reactor is about 200 p.p.m.
The distillate (in pipe 12) contains only 0.3% by weight of methoxy propionaldehyde.
The product withdrawn (through pipe 9) contains below 0.1% by weight of acrolein, the remainder being methanol and methoxy propionaldehyde.

During the five hours there is produced 1165 g. of $\beta$-methoxy propionaldehyde.

Upon vaporizing a small amount of product withdrawn by pipe 9, it is found to contain, per kilogram, 7 g. of high boiling by-products or polymers. Assuming that these substances are acrolein polymers, there is found that the methoxy propionaldehyde yield with respect to acrolein is 98.5%.

EXAMPLE 2

The operation is analogous with that of Example 1 but is carried out at a higher temperature. The operation conditions at the equilibrium are as follows:

Acrolein (stabilized with 0.1% of hydroquinone) feed rate through pipe 18—0.24 liter per hour.
Methanol feed rate through pipe 15—0.43 liter per hour.
Feed rate of the solution at 1 g. per liter of trimethyl amine in methanol through pipe 19—0.05 liter per hour.
Contact time, about 20 minutes
Temperature at the inlet of reactor 1—20° C.
Temperature at the outlet in reactor 1—28° C.
Aldehyde content of the reaction mixture leaving reactor 1—1.5 moles/kg.
Temperature at the top of column 5—64° C.
Flow rate of the distillate through pipe 12—6 liters per hour
Temperature in boiler 6—66° C.
Aldehyde content of the mixture withdrawn by pipe 9—6.05 moles/kg.

Over 5 hours running at the equilibrium, the balance is as follows:

Acrolein fed—995 g.
Methanol fed—1885 g.

Product (with 6.05 moles/kg. of aldehyde) withdrawn by pipe 9—2873 g.

Chromatographic analysis shows that:

At the exit from the reactor, the conversion rate of acrolein to methoxy propionaldehyde is 36%.
The trimethyl amine content in the reactor is about 100 p.p.m.
The methoxy propionaldehyde content of the distillate and the acrolein content of the product withdrawn are the same as in Example 1.

During the five hours there is produced 1530 g. of $\beta$-methoxy propionaldehyde. The product withdrawn (through pipe 9) contains, per kg., 8 g. of high boiling by-products. The methoxy propionaldehyde yield with respect to acrolein is 97.7%.

EXAMPLE 3

The operation is analogous with that of Example 1 but ethanol is used instead of methanol.

The operation conditions at the equilibrium are as follows:

Stabilized acrolein feed rate—0.145 liter per hour.
Ethanol feed rate—0.43 liter per hour.
Trimethyl amine solution feed rate—0.05 liter per hour.
Contact time—about 30 minutes.
Temperature at the inlet of reactor 1—9° C.
Temperature at the outlet of reactor 1—18° C.
Aldehyde content of the reaction mixture leaving reactor 1—1.7 moles/kg.
Temperature at the top of column 5—77° C.
Distillate flow rate (pipe 12)—3.4 liters per hour.
Temperature in boiler 6—80° C.
Aldehyde content of the mixture withdrawn by pipe 9—3.62 moles/kg.

Over 5 hours running at the equilibrium, the balance is as follows:

Acrolein fed—605 g.
Ethanol fed—1902 g.
Product (with 3.62 moles/kg. of aldehyde) withdrawn by pipe 9—2488 g.

Chromatographic analysis shows that:

At the exit from the reactor, the conversion rate of acrolein to $\beta$-ethoxy propionaldehyde is 33%.
The trimethyl amine content in the reactor is about 100 p.p.m.
The distillate contains substantially no ethoxy propionaldehyde.
The product withdrawn through pipe 9 contains only ethanol and ethoxy propionaldehyde as comparatively low boiling substances.

During the five hours, there is produced 758 g. of ethoxy propionaldehyde. The product withdrawn through 9 contains, per kg., 75 g. of substances having boiling points higher than that of ethoxy propionaldehyde. The ethoxy propionaldehyde yield with respect to acrolein is 69.5%.

It will be understood that changes may be made in the formulation and operation without departing from the spirit of the invention, especially as defined in the following claims.

I claim:

1. A process for producing a $\beta$-alkoxy aldehyde comprising condensing a lower $\alpha,\beta$-olefinic aldehyde with a lower alkanol in the presence of 50–300 p.p.m. of a catalyst consisting essentially of a volatile tertiary amine selected from the group consisting of trimethyl amine, ethyldimethyl amine and diethylmethyl amine, and removing the amine by distillation after the reaction has been completed.

2. A process as claimed in claim 1 in which the $\alpha,\beta$-olefinic aldehyde is acrolein.

3. A process as claimed in claim 1 in which the alkanol is selected from the group consisting of methanol and ethanol.

4. A process as claimed in claim 1 in which the amine has a boiling point below that of each of the reactants as well as the reaction product.

5. A process as claimed in claim 1 in which the reaction time is within the range of 10 to 45 minutes.

6. A process as claimed in claim 1 in which the reaction temperature is within the range of 5° to 30° C.

7. A process as claimed in claim 1 in which the reaction temperature is within the range of 15° to 20° C.

8. A process as claimed in claim 1 in which the reaction is carried out at a pressure corresponding to atmospheric pressure or slightly above.

9. A process as claimed in claim 1 in which the reaction is carried out at a pressure which does not exceed 1 kg./cm.$^2$, effective.

10. A process as claimed in claim 1 in which the alkanol is present in excess.

11. A process as claimed in claim 1 in which the process is carried out as a continuous operation by passing the reaction mixture through a reaction zone followed by distillation in which the amine is separated from the head of the distillation column while $\beta$-alkoxy aldehyde is removed from the base of the distillation column.

12. A process as claimed in claim 11 in which an aldehyde content of 1 to 2 moles/kg. of reaction mixture is maintained in the reaction zone.

13. A process as claimed in claim 11 in which the conversion rate of olefinic aldehyde is maintained within the range of 25% to 40%.

14. A process as claimed in claim 11 in which an alkoxy aldehyde content of 50% to 70% is maintained in the mixture of alkoxy aldehyde and alkanol withdrawn from the base of the distillation column.

15. A process as claimed in claim 11 which includes the step of washing the effluent from the head of the column with alkanol before return of the alkanol to the process.

16. A process as claimed in claim 11 in which the amine catalyst is continuously fed to the process as a solution in alkanol in an amount to compensate for the amine catalyst lost during the reaction.

References Cited
UNITED STATES PATENTS

| | | | |
|---|---|---|---|
| 2,704,298 | 3/1955 | Bellringer et al. | 260—602 |
| 2,694,732 | 11/1954 | McTeer et al. | 260—602 |
| 2,504,680 | 4/1950 | Gresham | 260—602 |

BERNARD HELFIN, Primary Examiner

R. H. LILES, Assistant Examiner